Jan. 6, 1970   C. M. HIRST, JR   3,487,716
BRAKE CABLE OPERATING MEANS
Filed March 28, 1968   2 Sheets-Sheet 1
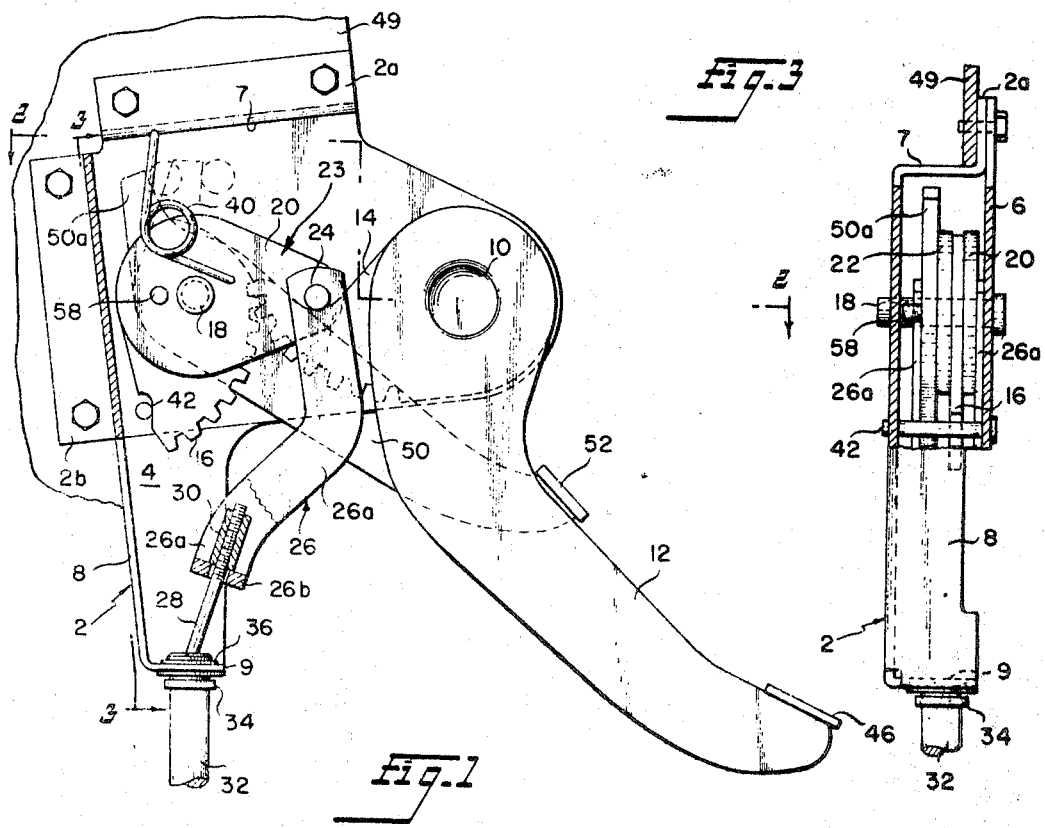
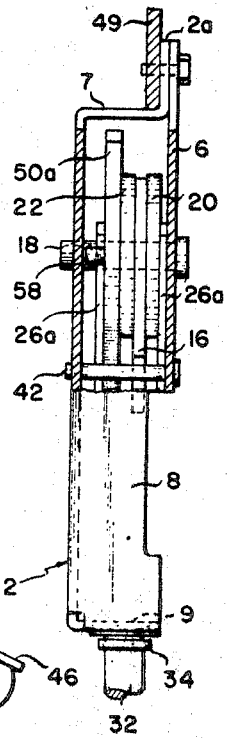
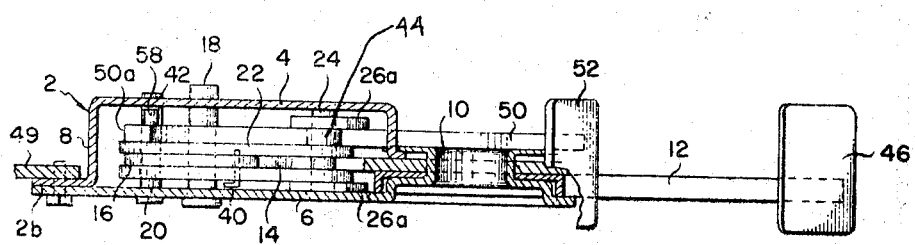
INVENTOR
Charles M. Hirst, Jr.
BY Lawrence E. Laufscher
ATTORNEY

United States Patent Office 3,487,716
Patented Jan. 6, 1970

3,487,716
BRAKE CABLE OPERATING MEANS
Charles M. Hirst, Jr., Moberly, Mo., assignor to Orscheln Brake Lever Mfg. Company, Moberly, Mo., a corporation of Missouri
Filed Mar. 28, 1968, Ser. No. 716,923
Int. Cl. G05g 1/04
U.S. Cl. 74—516                                   7 Claims

ABSTRACT OF THE DISCLOSURE

Brake cable operating means characterized by the provision of elliptical gear means for effecting initial rapid movement of the cable tensioning member at a low mechanical advantage ratio to take up cable slack and stretch, and for effecting subsequent operation at a high mechanical advantage ratio to apply high stress to the cable during final travel. The brake lever and elliptical gears are freely movable in either direction until an over-dead-center brake engaged position is reached, whereupon the lever operating means is locked against free movement.

---

Figure 4:
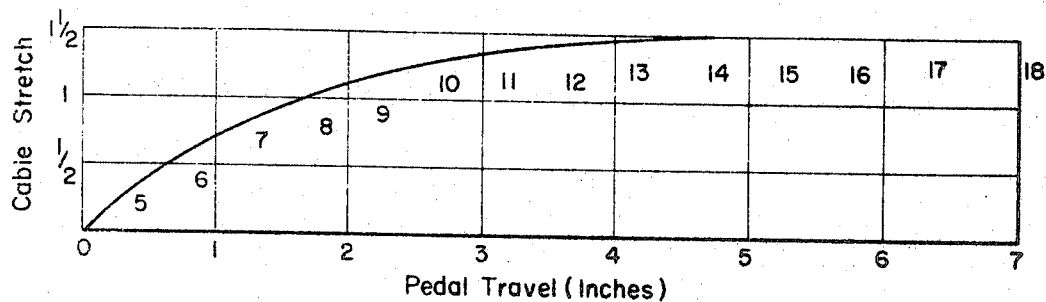

As evidenced by my prior Patent No 2,928,292 and the Orscheln Patents 2,171,403 and 2,464,096, and my allowed prior patent application Ser. No. 547,272 filed May 3, 1966, now U.S. Patent No. 3,379,074, various lever operated mechanisms have been proposed for actuating the brake cables of a motor vehicle. It is further known in the prior are to provide emergency or packing brake lever mechanisms of the conventional pawl and ratchet type, hand-operated release means generally being provided for releasing the pawl from the ratchet. These latter types of actuating means possess certain inherent structural and operational drawbacks. For example, owing to the stresses involved, brake means of the pawl and ratchet type must be connected by strut means to the vehicle, thereby constituting a safety hazard when the vehicle is involved in a front end collision. The conventional hand release lever associated with the known brakes also presents a safety hazard. Furthermore, in operation there are no means other than the hand release handle for releasing a wholly or partially applied brake, and consequently there is always a possibility of damaging a vehicle by driving without the hand brake being fully released.

The primary object of the present invention is to provide brake cable operating means that are designed to initially apply a low mechanical advantage ratio to the cable actuator to rapidly take up cable slack and stretch, and subsequently to exhibit a high mechanical advantage ratio to achieve high brake cable stress during final travel of the brake pedal. In this regard, use is made of specially designed elliptical gear means in which the arc subtended by the driven elliptical gear is appreciably greater than that subtended by the brake lever (and the driving elliptical gear connected thereto) during application of the emergency brake.

Another object of the invention is to provide brake operating means in which the brake lever is freely movable in either direction until—during braking—a given final over-dead-center position is reached in which the lever arrangement is locked in the brake engaged condition. To this end, the configurations of the elliptical gears are such that during application of the brake, the point of engagement of the gears is progressively displaced toward an over-dead-center position, whereupon through toggle action the assembly is temporarily locked in place.

A further object of the invention is to provide foot-operated brake release means for returning the lever arrangement from the over-dead-center position, whereupon the brake lever is again released for movement in either the brake applying or brake removing directions. According to a further feature, the brake release lever has a foot pad adjacent the brake lever foot pad, so that upon actuation of the brake release lever, the brake lever is automatically pivoted to displace the brake pedal to a position in engagement with the operator's foot. In addition to the obvious safety advantage, this arrangement permits the motor vehicle to be safely operated by use of the emergency brake means in the event of failure of the primary brake system.

Figure 5:
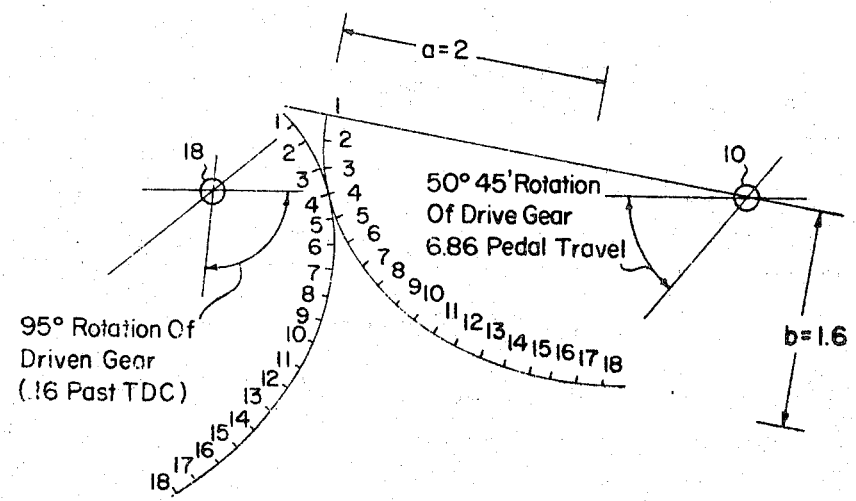

Other objects and advantages of the invention will become apparent from a study of the following specification, when viewed in the light of the accompanying drawing, in which:

FIG. 1 is a front elevational view, with certain parts broken away, of the brake cable operating means of the present invention;

FIGS. 2 and 3 are sectional views taken along lines 2—2 and 3—3 of FIG. 1, respectively;

FIG. 4 is a graphical illustration of the operation of the assembly to afford low mechanical advantage ratio during initial brake lever travel to rapidly take up cable slack and stretch, and subsequently to provide high mechanical advantage ratio during and through final travel of the lever; and FIG. 5 is a graphical illustration of the operation of the elliptical gears.

Referring first more particularly to FIGS. 1–3, the brake operating means includes a sheet metal housing 2 and having a pair of side walls 4 and 6, a top wall 7, a rear wall 8 and a bottom wall 9. At one end, the side walls are embossed to define a pivot support 10 upon which is pivotally mounted a unit comprising a brake lever 12 and an elliptical driving gear 14. The driving gear 14 is in enmeshing engagement with an elliptical driven gear 16 that is rotatably mounted on shaft 18 extending between side walls 4 and 6. Secured on opposite sides of the driven elliptical gear 16 are a pair of parallel plates 20, 22 that define a first toggle arm 23 between the free ends of which is mounted a shaft 24 that pivotally carries the arm portions 26a of a U-shaped yoke 36 that defines a second toggle arm. The yoke includes at its lower end a bridging portion 26b containing an opening through which extends a brake cable 28 upon the upper threaded end of which is mounted the adjustable slug 30. The cable slidably extends through the outer sheath 32 that is secured at its upper end in a corresponding opening in the housing bottom wall 9 by means of the ferrule 34 and spring clip 36.

The driven elliptical gear 16 is biased by return spring 40 in the clockwise direction toward the illustrated brake released position, in which the gear abuts the stop rod 42 that extends between the housing side walls 4 and 6. The spring 40 at one end includes a lateral extension connected with the gear 16, and at the other end the spring abuts the housing top wall 7. As shown in FIG. 2, a spacer washer 44 is mounted on shaft 24 between plate 22 and yoke arm 26a.

The brake lever 12 carries at its free end a foot pad 46 by means of which the lever and driving gear 14 are pivoted in the clockwise direction to rotate driven gear 16 and plates 20 and 22 in the counter clockwise direction, whereby pin 24 and yoke 26 are elevated relative to the housing bottom wall 9 and sheath 32 to apply stress to cable 28 and thereby operate the brake means (not shown). Referring to FIGS. 4 and 5, the configurations of the elliptical gears 14 and 16 are such that during clockwise movement of the brake lever 12 from the illustrated position toward the brake fully engaged position, initially the lever assembly rapidly takes up cable slack and stretch at a low mechanical advantage ratio (as shown by the initial steep portion of the cable-stretch vs. pedal travel curve of FIG. 4), and subsequently affords high mechanical advantage ratio during and through its final travel as shown by the flat portion on the curve. Referring to FIG. 5, the gear configurations are such that for a 50° 45′ rotation of the drive gear 14 (corresponding to a 6.86 inch pedal travel) the driven gear is rotated through an angle of 95°. During this movement of the brake lever, the point of engagement is displaced to the right on the centerline connecting the axes 10 and 18, until near the end of travel of the lever, the point of engagement reaches a point at which toggle arm 23 displaces pivot shaft 24 over dead center (as shown in phantom) dead center to lock the assembly in a final position in which the brake is fully engaged.

The housing 2 is provided at its top and ends with external planar extensions 2a, 2b respectively, containing apertures by means of which the housing may be bolted to the lower portion of the instrument cowling 49 of a motor vehicle.

In accordance with another important feature of the invention, foot-operated brake release means are provided for releasing the assembly from the aforementioned over-center brake engaged position. More particularly, a brake release lever 50 having a foot pad 52 is journalled intermediate its ends on shaft 18, the free end portion 50a of said lever having a projecting configuration to engage spacer washer 44 when the pin 24 is elevated by counterclockwise rotation of gear 16 and plates 20, 22 to the brake engaged position shown in phantom in FIG. 1. Lateral extension 58 carried by the lever side 50 provides a side bearing against the housing side wall 4 during travel of the lever 50. Thus, when release pedal 52 is depressed, pin 24 is displaced over dead center by lever projection 50a, whereupon spring 40 biases gear 16 and plates 20 and 22 in the clockwise direction to lower pin 24 and yoke 26 to release the stress on cable 28. During this time, driving gear 14 and brake lever 12 are pivoted in the counterclockwise direction until the brake pad 46 reaches a position adjacent the foot pad 52, whereupon the operator's foot is arranged to engage both pedals. Thus the advantage is afforded that actuation of the release lever automatically returns the brake lever to the operator's foot, permitting the operator to fully release the applying lever without noise or shock to the cable assembly, lever assembly or body attachments. Furthermore, the design is such to enable the operator to partially apply the parking brake system if he so desires.

It is apparent from the foregoing description that in order to fully engage and hold the cable stress applied by the brake lever, the operator must apply sufficient foot pressure to toggle the elliptical gears over-center to the brake engaged position, whereupon the stressed condition is maintained until the operator actuates the release mechanism. Since the lever assembly can only be locked in the fully engaged position, it does not contribute to the brake lining wear that occurs with the conventional ratchet and pawl assembly when a motor vehicle is driven with the brakes partially applied. A further advantage results from the fact that the lever assembly may be used in an emergency situation where the service brakes have failed, since the operator may easily perform the foot operated brake applying or release functions. Such is not the case with a conventional pawl and ratchet arrangement, wherein hand control means are provided for actuating the release mechanism.

The subject invention affords, in addition, valuable safety features. More particularly, the design of the lever assembly reduces the stress applied to the mounting points on the vehicle, since these stresses are absorbed in the lever assembly itself. This permits the use of mounting brackets which will allow the lever assembly to move away from the operator more readily in the event of a front end collision. Current ratchet and pawl assemblies must be rigidly strutted to the vehicles, thereby presenting a safety hazard. Furthermore, owing to the elimination of the conventional hand release rod and handle means that accompany current pawl and ratchet means, an additional safety hazard has been obviated.

While in accordance with the provisions of the patent statutes, the preferred form and embodiment of the invention has been illustrated and described, it will be apparent to those skilled in the art that various modifications and improvements may be made in the apparatus described.

What is claimed is:
1. Vehicle brake cable operating means, comprising
   (a) a housing (2) adapted for connection with the vehicle body;
   (b) a brake cable (28) extending at one end within said housing;
   (c) toggle means connecting said cable end with said housing, comprising a pair of pivotally connected toggle arms (23, 26) a first one (23) of which is connected at its free end with said housing, the other of said toggle arms being connected at its free end with said cable, said toggle means being operable to progressively tension said cable during pivotal movement of said first toggle arm from a released position toward an overcenter locked position relative to the second toggle arm;
   (d) a brake lever (12) pivotally connected with said housing; and
   (e) elliptical gear means responsive to pivotal movement of said brake lever in a given brake applying direction for pivoting said first toggle arm in the cable-stressing direction toward said overcenter locked position, said elliptical gear means including intermeshing driving (14) and driven (16) gears connected with said brake lever and said first toggle arm, respectively, said elliptical gears having such a configuration that during pivotal movement of said brake lever in said brake applying direction, the radii of said driving and driven elliptical gears decrease and increase, respectively, whereby said first toggle arm is initially pivoted at a relatively high angular velocity to quickly take up cable slack, and is subsequently pivoted with relatively high torque to apply relatively high tensile force to the cable during final lever travel.

2. Apparatus as defined in claim 1, and further including spring means (40) biasing said first toggle arm away from the overcenter locked position.

3. Apparatus as defined in claim 2, and further including stop means (42) connected with said housing for limiting the extent of pivotal movement of said driven elliptical gear and said first toggle arm in the cable releasing direction.

4. Apparatus as defined in claim 2 and further comprising release lever means (50) operable to release said toggle means from the locked over-center condition.

5. Apparatus as defined in claim 4, wherein said release lever means includes a release lever pivotally connected with said housing, said brake and release levers each including a foot pad and being so connected with said housing that upon operation of said release lever to release said toggle means from the locked overcenter condition, said brake lever is rotated in the brake releasing direction by said spring means to position the brake foot pad adjacent the release foot pad.

6. Apparatus as defined in claim 4, wherein said release lever means includes a release lever pivotally connected with said housing for movement about the axis of said driven gear, said brake lever being pivoted about the axis of said driving gear.

7. Apparatus as defined in claim 6, wherein said first toggle arm comprises a pair of spaced parallel plates (20, 22) connected on opposite sides of and parallel with said driven elliptical gear;

and further wherein said other toggle arm comprises a U-shaped yoke including a spaced pair of arm portions straddling and pivotally connected at one end with said plates, respectively, and a bridging portion connected between the other ends of said arms, respectively;

and means connecting said cable end with said yoke bridging portion.

References Cited

UNITED STATES PATENTS

| 542,088 | 7/1895 | Masterman | 74—518 |
| 2,975,654 | 3/1961 | Vigmostad | 74—516 X |
| 3,051,015 | 8/1962 | Hinsey | 74—512 X |
| 3,236,120 | 2/1966 | Fender | 74—512 X |

MILTON KAUFMAN, Primary Examiner